United States Patent [19]

Stäbler et al.

[11] 4,343,115
[45] Aug. 10, 1982

[54] PROTECTING HOOD FOR A MOTOR-DRIVEN HAND TOOL

[75] Inventors: Manfred Stäbler; Fritz Schädlich, both of Leinfelden-Echterdingen, Fed. Rep. of Germany

[73] Assignee: Robert Bosch GmbH, Stuttgart, Fed. Rep. of Germany

[21] Appl. No.: 121,257

[22] Filed: Feb. 13, 1980

[30] Foreign Application Priority Data

Mar. 30, 1979 [DE] Fed. Rep. of Germany ... 7909078[U]

[51] Int. Cl.³ .............................................. B24B 55/04
[52] U.S. Cl. .................................. 51/268; 144/251 R; 30/377
[58] Field of Search ............... 51/268, 170 PT, 170 R, 51/269, 272; 144/251 R, 252 R; 30/371, 374, 375, 377; 411/153

[56] References Cited

U.S. PATENT DOCUMENTS 2,189,246  2/1940  Henry .................................. 51/268
2,201,930  5/1940  Stark ................................... 411/153

FOREIGN PATENT DOCUMENTS 843300  7/1952  Fed. Rep. of Germany ........ 30/374
2216990  3/1973  Fed. Rep. of Germany ........ 30/377

Primary Examiner—Roscoe V. Parker
Attorney, Agent, or Firm—Michael J. Striker

[57] ABSTRACT

A protecting hood assembly for use in a motor-driven hand tool such as grinder or circular saw. The assembly includes a hood having a pair of openings, each being formed with a narrowing portion of a squared cross-section and a widened portion forming a slot, a pair of vertically positioned supporting members each having a longitudinal slit and a couple of bolts having each a peripheral portion inserted into said slit and said opening. The widened portion of the opening receiving the bolt is formed with a size in a horizontal direction being larger that a diameter of the peripheral portion of the bolt and a size in a vertical direction being smaller that said diameter to facilitate the installation of the bolt into the hood opening upon assembling and to provide a reliable clamping of said bolt in assembly after insertion thereof.

11 Claims, 3 Drawing Figures

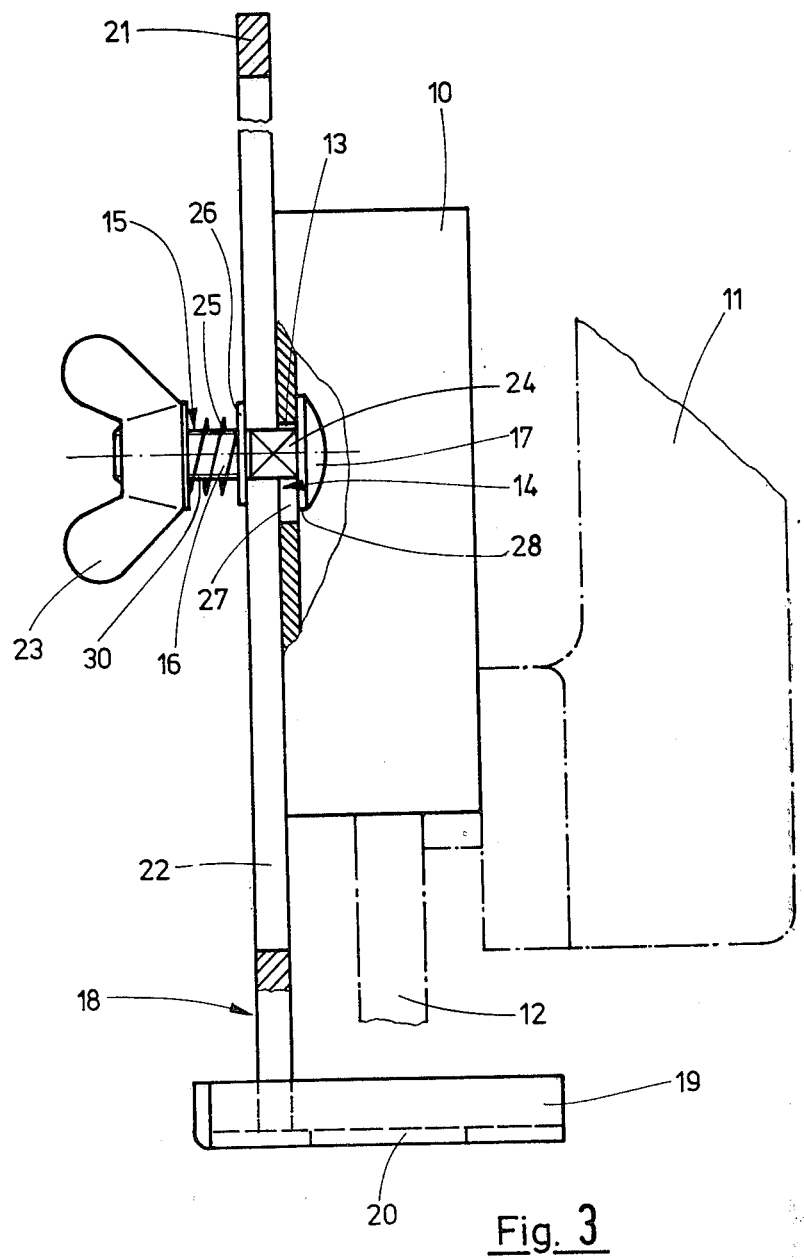

PROTECTING HOOD FOR A MOTOR-DRIVEN HAND TOOL

BACKGROUND OF THE INVENTION

The present invention relates to protecting hoods utilized for covering a tool in motor-driven hand operative tools, such as, for example, grinders or circular saws and more particularly to mounting support elements connected to the tools.

In the assemblies known in the art, for example described in German Auslegeschrift No. 2 216 990, a hood is provided with openings to receive screw bolts passing therethrough for connecting the support element to the hood. These openings have narrowing portions and widened portions to facilitate insertion of fastening bolts having peripheral heads. These bolts are normally tightened in the assembly by means of nuts mounted on the respective threaded portions of the bolts. Support elements normally include two parallel vertical members slidable relative to a bearing plate of a tool base and having longitudinal slits through which fastening bolts are passing. A hood is formed with two corresponding openings having narrowing portions and widened portions. The widened portions are so disposed on the hood that bolts inserted into slits of the support members and held by them are installed into the widened portions which receive the bolts when the slits of the supporting members are in engagement with the hood, the bolts then are turned down or inclined within the boundary edges provided with the hood. In one case the size of the widened portions should be larger than the size of the slit of support member. In the other case the opening with the widened portion and the bolt should be displaced one against the other in such a manner that the widened portion is in its intermediate position against the slit. A formation and disposition of the openings made in the hoods to receive the fastening bolts should facilitate assembling and disassembling of the support elements with the hoods so that when during separating the bolts from the hood the bolts will pass through the widened portions of the hood openings and the disassembling will be made without a risk that the released bolts will fall out. Otherwise the assembling and disassembling of the above-described arrangements is rather complicated.

In conventional arrangements in assembling first of all, a bolt is guided through the widened portion of one of the hood openings. Then this bolt is shifted within said widened portion. After this the support element is turned about the bolt until a second bolt in the other slit passes into its respective widened portion of the respective opening. Then the support elements are turned again so that the longitudinal slits return to the vertical positions to thereby set both bolts in their proper positions.

SUMMARY OF THE INVENTION

It is an object of the present invention to provide an improved assembly of the support member on a protecting hood for a motor-driven hand operative tool.

Another object of this invention is to provide a hood assembly which is easy to assemble.

Still another object of this invention is to provide a protecting hood assembly which is reliable in the assembled position.

These and other objects of the invention are achieved by providing a hood with at least one opening having a narrowing portion and a widened portion to receive fastening means, such as a bolt formed with a threaded projection and a peripheral head portion. The size of the opening in a horizontal direction is of a dimension relatively larger than a diameter of the peripheral head portion of the bolt and the size of the opening in the vertical direction is relatively smaller than said diameter. Such an arrangement permits one to easily insert the peripheral head portion of the bolt into the opening from the side of the support member and prevents the bolts from falling down during disassembling of the support member connected to the hood.

The bolt is formed in accordance with the present invention with a squared portion whose shape corresponds to a substantially rectangular shape of the narrowing portion of the opening to facilitate the insertion of the bolt into the opening. An axial helical spring is provided on the threaded portion of the bolt which is tightened with a butterfly nut in assembly.

Two openings may be formed on the hood corresponding to two longitudinal slits formed in two vertical support members, respectively. The adjustment of the support members in a vertical direction with respect to the protecting hood is provided. For this purpose the nuts are released and the support members may be easily lifted by overcoming the force of a spring on the threaded portion of the bolt and then the nuts on the bolts may be tightened again.

BRIEF DESCRIPTION OF THE DRAWINGS

FIG. 3 is a partial sectional elevational view of the assembly of the protecting hood with the guide support.

DETAILED DESCRIPTION OF THE INVENTION

Figure 1:
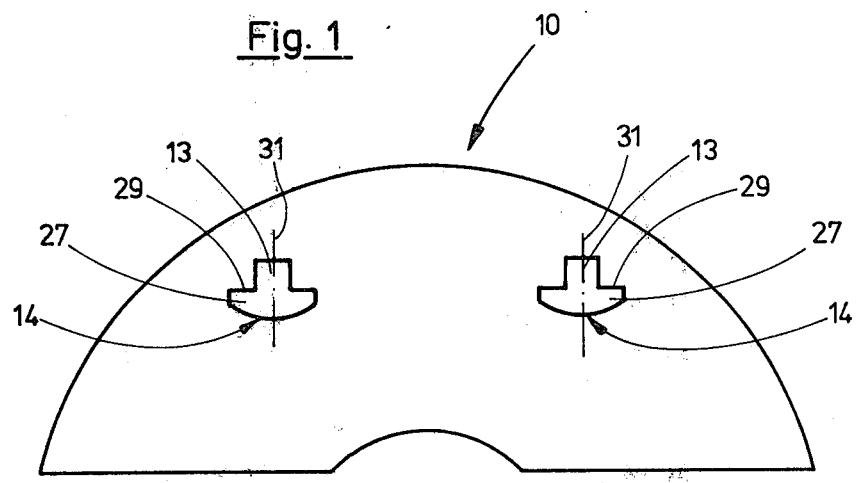
FIG. 1 is a front view of a hood in accordance with the present invention.
Figure 2:
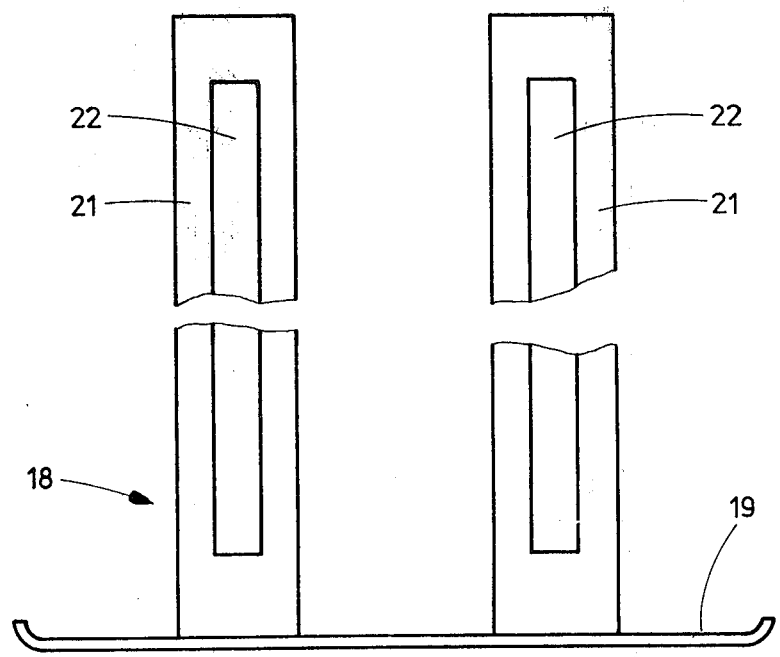
FIG. 2 is a front view, partially interrupted, of a guide support which is assembled on the protecting hood illustrated in FIG. 1.

Referring to the drawings, a protecting hood 10, which can be utilized in a motor-driven hand operative tool such as, for example a grinder or a circular saw, is connected to an angular grinder shown as 11 in dotted lines. The hood and covers a tool, such as a grinder disk 12 illustrated in FIG. 3 in dotted lines. As can be seen in FIG. 1, protecting hood 10 includes a pair of openings 14, each including a narrowing portion 13 and a widened portion 27. Openings 14 are disposed substantially symmetrically on the front wall of the hood 10 and serve for mounting guide supports 18 of the tool on protecting hood 10. Openings 14 are formed in the protecting hood to receive respective screw bolts 15 passing therethrough. Bolt 15 includes an elongated portion 16, a squared portion 24 and a head 17 which is formed with a circular peripheral portion 28 and an end portion having a rounded surface. As shown in FIG. 2, a guide support 18 includes a pair of vertical support members 21 which are slidably mounted on a sliding surface 20 of a bearing element 19 to be horizontally adjusted with respect to the tool 12. Each of the vertical members 21 of the guide support is provided with a longitudinal vertical slit 22 which provides a probability of an adjustment of the guide support 18 in a vertical direction with respect to hood 10. In order to connect and fix the support members 21 of the guide support 18 to protecting hood 10 the elongated portion 16 of the screw bolt 15 is inserted into slit 22 of support member 21. Bolt 15 is then braced on the support member 21 by means of a butterfly nut 23.

Openings 14 are formed with narrowing portions 13 of a substantially rectangular cross-section merging into downwardly extending widened portions 27 which project equally outwardly in a horizontal direction from an axis of symmetry 31 dividing opening 14 into two equal portions. A rectangularly shaped portion 13 of opening 14 substantially corresponds to a squared portion 24 formed on the screw bolt 15.

In assembling, upon positioning a square-shaped projection 24 within portion 13 an essential form-locking connection may be achieved after the butterfly nut is mounted on elongated portion 16, this prevents the portion 16 from rotating.

An axial compression spring 25 is located on the elongated portion 16 between butterfly nut 23 and a lateral wall of support member 21 which is preferably a cylindrical helical spring. This spring is positioned in contact with a washer 26 mounted on the elongated portion 16. A second washer of the same size may be mounted on an opposite lateral side of support member 21 in contact with longitudinal slit 22.

Narrowing portions 13 and widened portions 27 of both openings 14 positioned essentially symmetrically relatively to a central axis of the hood 10 are in the position corresponding to locations of respective slits 22 of members 21 which are also disposed at an equal distance from the central axis. As was mentioned above, rectangulary shaped portions 13 substantially correspond in size to that of squared projection 24 formed on bolt 15. The axis of symmetry 31 of opening 14 is substantially parallel to a central axis of symmetry of the front side of the hood 10. Widened portions or slots 27 are of a length that is relatively larger than the diameter of the head 17 of bolt 15 to permit head 17 with its rounded surface to pass through opening 14 upon rotation. The inner surface of opening 14 defined by a length of the opening in a vertical direction is relatively smaller than the diameter of head 17 of screw bolt 15 so that the bolt 15 may be inserted with its head 17 through slots 27 upon rotation or pivoting movement of the bolt about peripheral portion 28. Slots 27 have at the lower end thereof the same contour as head 17 of bolt 15. The widened portions or slots 27 may have a mushroom-like shape which includes straight-passing lines 29 limited by boarders of narrowing portions 13. The portion of opening 14 enclosed by straight lines 29 is of a rectangular shape in one direction and of a circular cross-section in another direction.

Bolts 15 arranged in the slits 22 of guide support 18 are locked by butterfly nuts 23. This may be achieved, for example by provision of a deformed last thread coil on a threaded portion of bolt 15. When guide support 18 is separated from hood 10, head 17 of bolt 15 is pressed against the slit 22 with aid of axial spring 25. For assembling the guide support 18 on the hood 10, the slits 22 are positioned against the hood 10 so that slits 22 engage narrowing portions 13. Bolts 15 are pressed against the action of axial spring 25 so that head 17 passes through support member 21. Bolts 15 are inclined from their horizontal position to permit heads 17 to rotate within widened portions 27, and upon this rotating movement heads 17 pass through portions 27. After this movement the spring 25 pushes heads 17 with tension into the inner wall of hood 10. The guide support 18 can now be adjusted at a desirable height. The heads 17 in this position can not slip out from slots 27 because the diameter of head 17 at its rounded surface is relatively larger than the length in the vertical direction of opening 14. A further rotating of bolts 15 upon displacement of guide support 18 is prevented by a force exerted on axial spring 25. After the required adjustment of guide support 18 the butterfly nuts are tightened and guide support 18 is thereby in a clamped position.

For disassembling guide support 18, the butterfly nuts 23 are slackened to its end position shown in FIG. 3. Upon exertion of equal pressure on bolts 15 directed against the pressure of spring 25, the bolts tip down and move out of openings 14 due to slight rotation thereof in a clockwise direction. Heads 17 of bolts 15 in the inlined position pass through the inner wall of hood 10. Upon a further pivoting movement bolts 15 pass through slots 27, and finally guide support 18 becomes dismounted from hood 18. A lateral pressure on bolts 15 exerted through guide support 18 for lateral tipping the bolts down can depart the guide support 18 so that the latter is lifted up on the sliding element 19 and the lowermost part of hood 10 may be also lifted upon rotation in a clockwise direction. Heads 17 of bolts 15 are thereby snapped out from openings 14.

It will be understood that each of the elements described above, or two or more together, may also find a useful application in other types of constructions differing from the types described above.

While the invention has been illustrated and described as embodied in a protecting hood for a motor-driven hand operative tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by Letters Patent is set forth in the appended claims.

1. A protecting hood assembly for use with a motor-driven hand tool, comprising a hood; at least one supporting vertical member formed with an elongated slit; and fastening means for connecting said supporting member to said hood, said fastening means including at least one bolt having a threaded projection and a head formed with a peripheral portion having a rounded outer surface, said hood including at least one opening to receive said bolt, said opening having a narrowing portion of a substantially squared cross-section and a widened portion downwardly extending from an end of said narrowing portion and having a rounded lower surface, said widened portion having a size in a horizontal direction being relatively larger than a diameter of said peripheral portion of said bolt and said opening having a size in a vertical direction being relatively smaller than said diameter of said peripheral portion so that said head of said bolt is easily inserted into said elongated slit upon assembling and is thereafter inserted into said opening upon rotation of said bolt about said peripheral portion, and clamped on said hood.

2. The protecting hood assembly of claim 1, wherein two supporting vertical members are provided, and wherein said hood includes two openings to receive two respective bolts for connection of said supporting members to said hood.

3. The protecting hood assembly of claim 2, wherein said openings and said slits are positioned symmetrically relatively to the same axis of symmetry.

4. The protecting hood assembly of claim 1, wherein said opening is of a mushroom-like shape.

5. The protecting hood assembly of claim 1, wherein said bolt is provided with a squared portion formed between said threaded projection and said peripheral portion.

6. The protecting hood assembly of claim 5, wherein said narrowing portion is formed with a squared contour corresponding to said squared portion of said bolt for a mating engagement in the assembly.

7. The protecting hood assembly of claim 1, wherein said fastening means further include a nut positioned at an end of said threaded projection.

8. The protecting hood assembly of claim 7, further comprising an axial spring disposed on said threaded projection of said bolt.

9. The protecting hood assembly of claim 8, wherein a washer is positioned between said compression spring and said vertical member.

10. The protecting hood assembly of claim 1, wherein said bolt is a carriage bolt with square neck.

11. The protecting hood assembly of claim 1, wherein said opening include two symmetrically positioned portions connected to each other which constitute said narrowing portion and said widened portion.

* * * * *